Dec. 16, 1969  G. G. BARBEE ET AL  3,484,009
AUTOMATIC SHIFT MECHANISM FOR TWO WHEEL-FOUR
WHEEL DRIVE VEHICLE
Filed April 22, 1968  2 Sheets-Sheet 1
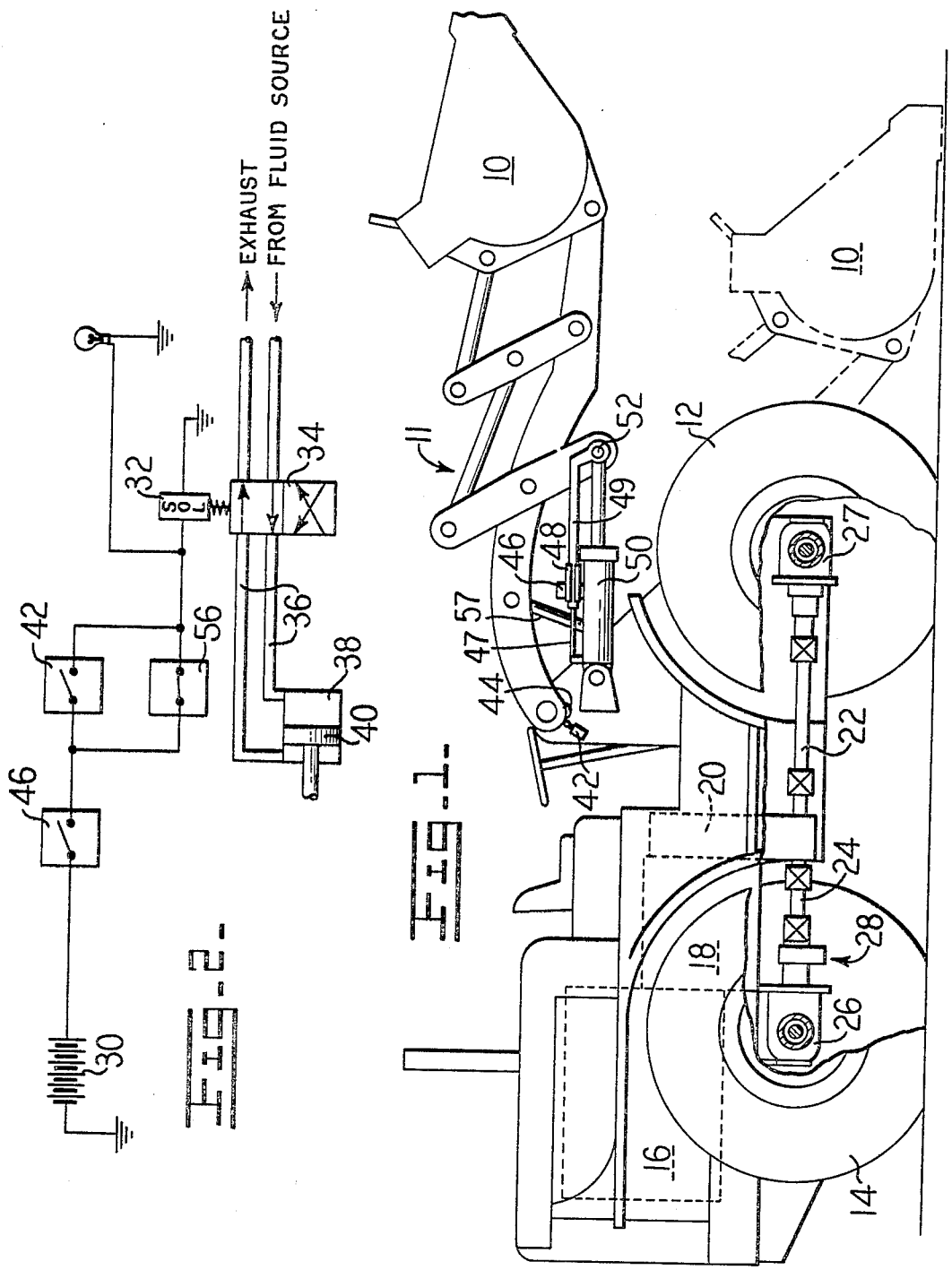
INVENTORS
GAIL G. BARBEE
JOHN W. MORTIMER
BY
ATTORNEYS

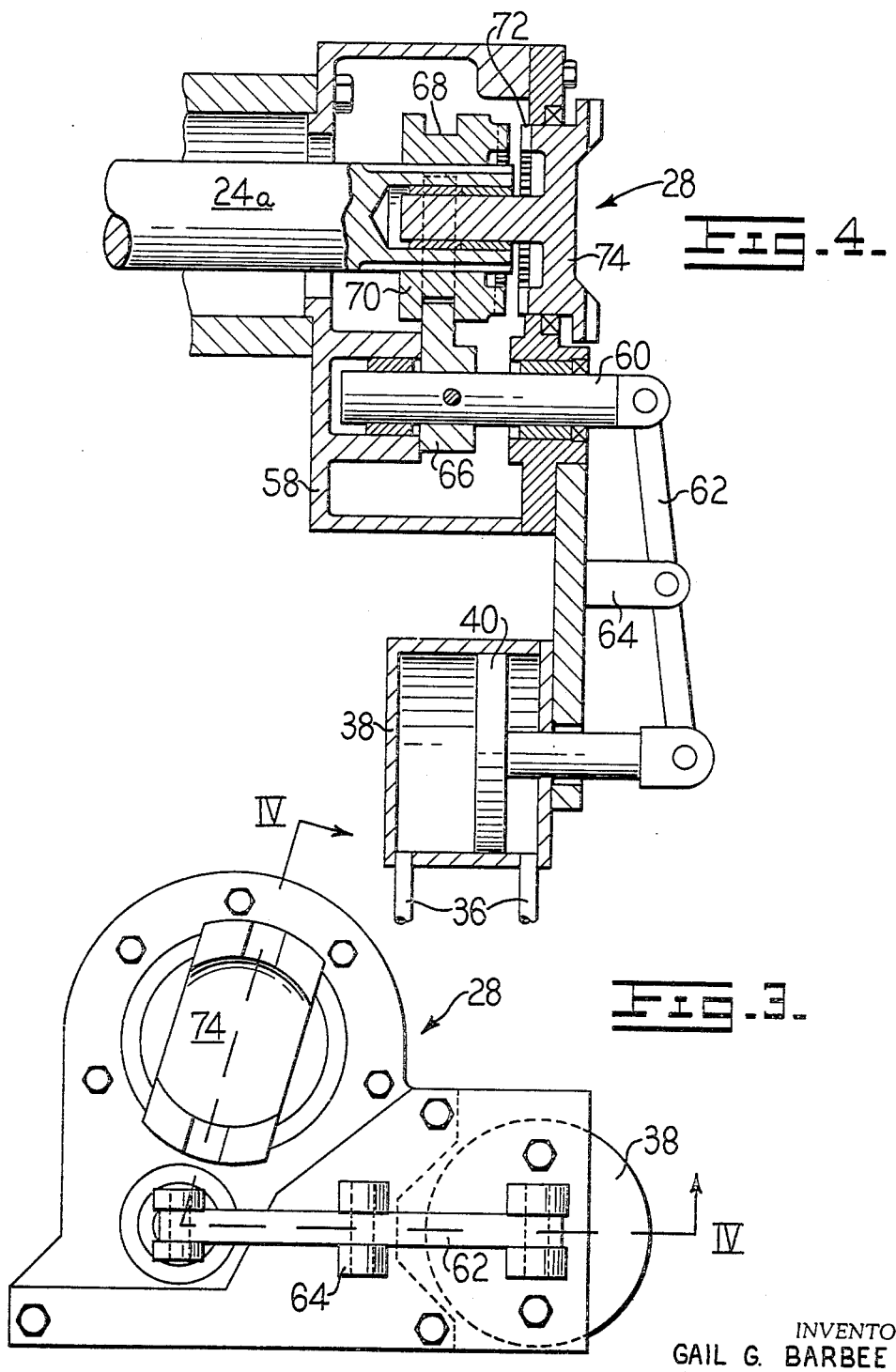

United States Patent Office 3,484,009
Patented Dec. 16, 1969

3,484,009
AUTOMATIC SHIFT MECHANISM FOR TWO WHEEL-FOUR WHEEL DRIVE VEHICLE
Gail G. Barbee and John W. Mortimer, Aurora, Ill., assignors to Caterpillar Tractor Co., Peoria, Ill., a corporation of California
Filed Apr. 22, 1968, Ser. No. 722,906
Int. Cl. B60k 17/34, 23/08
U.S. Cl. 214—762                              6 Claims

ABSTRACT OF THE DISCLOSURE

A vehicle having a four wheel drive with a clutch for disconnecting the drive to two wheels and means for automatically engaging and disengaging the clutch responsive to conditions under which the vehicle is operated.

---

Vehicles operating with a four wheel drive are often at a disadvantage, particularly where the front and rear wheels are not of the same size so that dragging or scuffing takes place, which is inconvenient and costly. Even in vehicles where the nominal size of the wheels is identical, the set of wheels bearing the greater load is, for practical purposes, reduced in diameter, creating the same costly disadvantage.

The invention to be described is applicable to vehicles used for various purposes, but is designed for and particularly applicable to a bucket loader vehicle, wherein the attitude of the bucket, as well as the total load carried and the terrain, are all taken into consideration when one set of wheels is to be engaged or disengaged from the drive. The present invention is, therefore, described in this application as applied to a wheel type loader with two wheel-four wheel drive, but is applicable to other types of vehicles, as will be readily understood as the description proceeds.

It is the object of the present invention to provide an automatic clutching and declutching mechanism for controlling drive to one set of wheels in a two wheel-four wheel type of vehicle in which the automatic mechanism is responsive to load as well as to position of vehicle components.

Further and more specific objects and advantages of the invention and the manner in which it is carried into practice are made apparent in the following specification by reference to the accompanying drawings.

In the drawings:

FIG. 1 is a view of a wheel type bucket loader shown in side elevation and with a part broken away to disclose some of the elements of the present invention with which the loader is equipped;

FIG. 2 is a schematic view showing the electric and fluid circuit, which effects automatic disconnection between the loader drive and one set of wheels;

FIG. 3 is a view in elevation of a clutch mechanism which forms a part of the invention; and FIG. 4 is a sectional view taken on the planes represented by the lines IV—IV of FIG. 3.

Referring first to FIG. 1, a wheel type loader is illustrated as having a bucket 10 supported on conventional and well known bucket lift and tilt linkage, generally indicated at 11, so that the bucket may be raised and lowered, tipped forwardly and racked rearwardly, all by well known hydraulic mechanism controlled by the tractor operator. The tractor is shown as having front wheels 12 and rear wheels 14. A drive is transmitted to the wheels from an engine, the position of which is indicated at 16, through transmissions contained in housings 18 and 20. A drive to the forward wheels is provided by a shaft 22 and to the rear wheels by a shaft 24, conventional differentials shown at 26 and 27 being employed to transmit torque to the individual wheels. A clutch mechanism, generally indicated at 28, and also shown in FIGS. 3 and 4 is disposed in the drive shaft 24 to the rear wheels for the purpose of causing driving of the wheels when certain operating conditions exist. Briefly, four wheel drive is required principally when the bucket is in a lowered position for loading as represented in dotted lines in FIG. 1, but when the bucket is raised to a carry position and is racked back to a carry position, two driven wheels will suffice for transporting a load.

As will presently be described in greater detail, a fluid actuated piston is employed to engage and disengage the clutch 28 in the drive to the rear wheels and fluid is directed to the piston in response to bucket position. Thus, as shown in FIGS. 1 and 2, a circuit including a battery 30 is provided to energize a solenoid 32 to actuate a valve 34 which controls fluid under pressure from a source, not shown, to a circuit 36 and a cylinder 38 with a clutch actuating piston 40 therein. A switch 42 shown in FIGS. 1 and 2 is adapted to be closed by a cam 44 when the bucket lift arms are lowered. In series with switch 42 is a switch 46, adapted to be closed by actuating means 48 on telescoping rods which extend from a tilt jack 50 to the end of its rod, as at 52. The switch 46 and one of the rods, indicated at 47, are affixed to the jack 50. The other rod, indicated at 49, is secured to the rod 52 and carries the actuating means 48. Both switches 42 and 46 are normally closed during loading operation when the bucket is down in the dotted line position of FIG. 1 and the lift arms are lowered. Thus, energy is supplied to solenoid 32 to shift the valve 34 against the force of its spring and direct fluid from its source to the rod end of the cylinder 38 to effect engagement of the clutch which directs power to the rear wheels of the vehicle. The position of the parts shown in FIGS. 1 and 2 is that assumed when the bucket is in the full line raised position with the switches 42 and 46 open.

There are conditions where, because of the terrain or lack of good traction, the four wheel drive might be desired when the bucket is in its carry position. To obtain four-wheel drive under those conditions, a normally open switch 56 of conventional pressure responsive design is connected in series with the switch 46 and solenoid 32 and in parallel with the switch 42. The switch 56 is in fluid communication with a portion of the hydraulic lift circuit including a hydraulic lift pack, partially indicated at 57 (FIG. 1), which is operable to raise and lower the bucket 10. Pressure response of the switch 56 is selected so that it is closed by pressure in the lift circuit caused by a load in the bucket. Consequently, in the two wheel carry position shown in FIG. 1 and with pressure in the lift circuit resulting from a load in the bucket, switch 56 is closed, assuming that the loader encounters poor terrain, requiring a four wheel drive. The operator can tilt the bucket forwardly a slight distance, just sufficient to close switch 46, thus completing the circuit through switches 46 and 56 to energize the solenoid and shift the valve 34 to the position opposite from that shown, in which the piston 40 is retracted and the rear wheels are engaged.

FIGS. 3 and 4 show the details of the clutch 28 which is actuated by the piston 40 in the jack cylinder 38. The cylinder, also shown at 38 in these views, is disposed alongside a clutch housing 58 and actuates a clutch control shaft 60, slidable in the housing, through a lever 62 which is pivotally supported on a bracket 64. The control shaft 60 carries a fork 66 which fits in a groove 68 of a clutch element 70 splined for sliding movement adjacent the end of shaft 24a which is aligned with drive shaft 24 shown in FIG. 1. Upon actuation of the jack to its extended position as shown in FIG. 2, the clutch element 70 is retracted from its position of engagement with a second clutch element 72 formed as a part of a universal joint, one half of which is shown at 74. This part of the universal joint is piloted in the end of the shaft 24a for relative rotation and the other one half of the universal joint, which is not shown, is fixed to the end of shaft 24 of FIG. 1. As is now apparent, actuation of the jack piston 40 in the opposite direction causes engagement of the clutch elements and imparts drive to the rear wheels of the tractor.

What is claimed is:

1. An automatic shift mechanism for a vehicle adapted for four wheel drive and including a load carrying implement and means for operating the implement, comprising:
   a clutch associated with two of the vehicle wheels, the clutch being operable to connect and disconnect drive to the two wheels, and
   clutch control means associated with the clutch and the implement operating means, the clutch control means being automatically operable to engage and disengage the clutch in response to operating conditions of the vehicle implement.

2. The invention of claim 1 wherein the automatically operable means are responsive to adjustment of the implement means for positioning the vehicle implement.

3. The invention of claim 1 wherein the automatically operable means are responsive to load conditions of the vehicle implement.

4. The invention of claim 1 wherein the vehicle is a bucket loader and the automatically operable means are responsive to positioning of the loader bucket on lift and tilt linkage.

5. The invention of claim 4 wherein the automatically operable means comprises solenoid actuated means for engaging and disengaging the clutch and first and second normally open switches disposed in series with each other, the solenoid and an electrical source, the first being associated with the bucket to be closed as the bucket is lowered by lift arms toward its loading position, the second switch associated with the bucket to be closed as the bucket is tilted forwardly from its carry position.

6. The invention of claim 5 further comprising a third normally open switch in electrical parallel with the first switch, the third switch to be closed in response to the bucket being loaded.

References Cited

UNITED STATES PATENTS 2,851,115  9/1958  Buckendale _____ 180—44 X
3,300,002  1/1967  Roper _____ 180—44 X HUGO O. SCHULZ, Primary Examiner U.S. Cl. X.R.

180—44